April 2, 1935.  J. SNODGRASS  1,996,260
EQUALIZER
Filed May 14, 1930
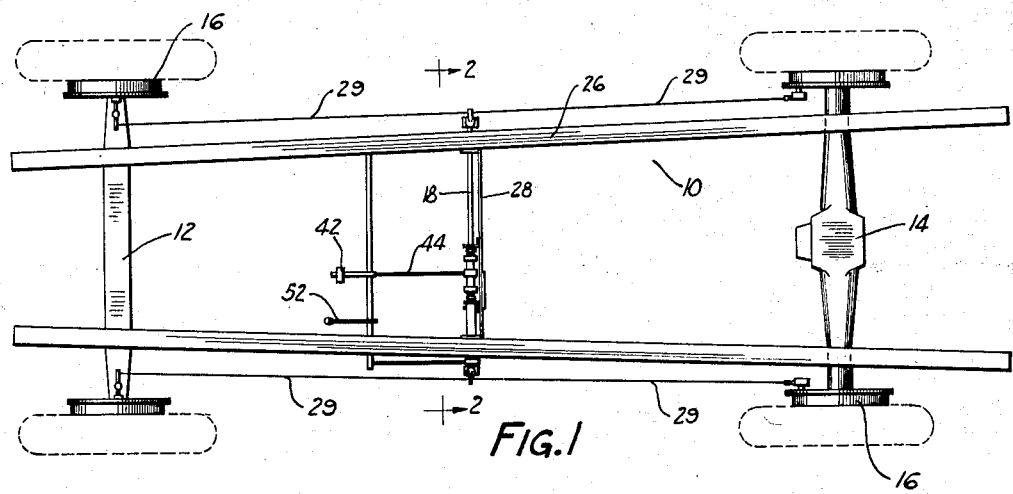
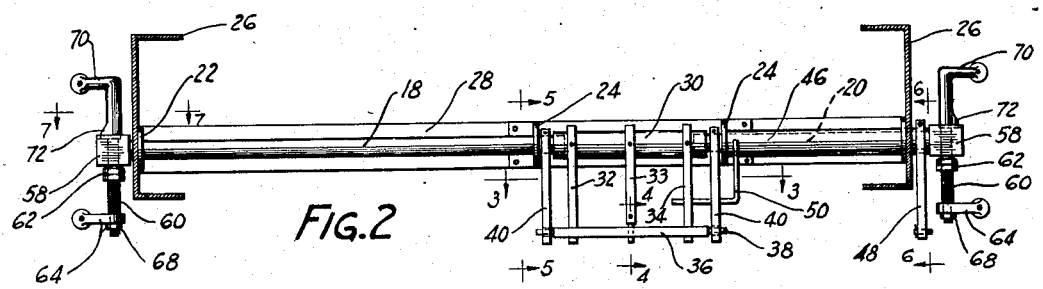
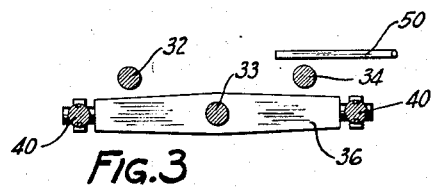
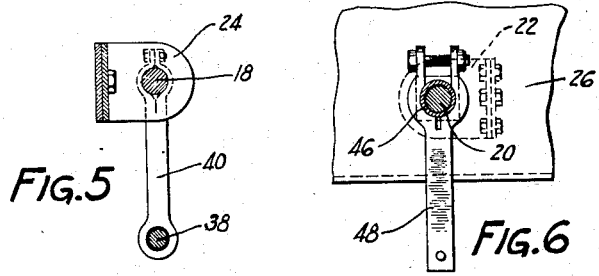
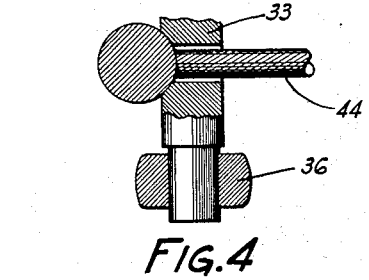
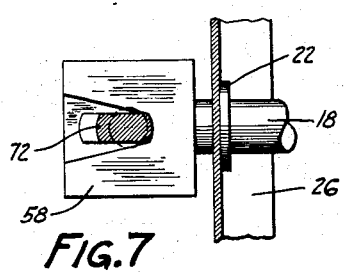
INVENTOR.
John Snodgrass
BY H. Q. Clayton
ATTORNEY Patented Apr. 2, 1935

1,996,260

UNITED STATES PATENT OFFICE 1,996,260

EQUALIZER

John Snodgrass, Shreveport, La., assignor to Bendix Brake Company, South Bend, Ind., a corporation of Illinois Application May 14, 1930, Serial No. 452,184

9 Claims. (Cl. 188—204)

This invention relates to brakes in general and more particularly to an operating mechanism for the four brakes of an automotive vehicle.

It is quite desirable with certain types of four wheel brakes that equal pressures be simultaneously applied thereto, and it is also quite desirable, if not absolutely necessary, that upon failure of that part of the operating mechanism actuating at least two of the brakes that the operating structure in general be so constituted as to insure operation of at least two of said brakes despite said failure.

To the above end, I have combined in one portion of the operating mechanism means for equalizing the pressures to the brakes on the right and left pairs of wheels of the vehicle and have in conjunction therewith provided a safety mechanism cooperating with the equalizing device to insure actuation of at least one of said pairs of brakes despite the failure of the connections to the other pair.

In one desirable arrangement, I have provided a single cross shaft structure comprising a plurality of spaced apart co-axial parts, together supporting an equalizing mechanism constructed and arranged to actuate said cross shaft parts, which mechanism co-operates with a safety mechanism, the latter also co-operating with the aforementioned shaft parts. The latter mechanism preferably comprises a tubular shaft telescoping the spaced apart ends of the co-linear cross shafts, said tubular shaft being provided with spaced apart arms rigidly secured thereto, the latter spaced from and adapted to co-operate with an equalizer bar indirectly connected to said shafts to operate the same.

As a further feature of my invention, I have provided a novel double arm structure at the end of the cross shaft parts which double arm structure is so constructed as to distribute equal applying forces to the front and rear brakes on each side of the car without necessitating other than rotative movement to said cross shaft parts.

I have accomplished the above by swivelling or journalling the two arms of a double arm lever structure in the ends of the cross shaft parts and as a further feature thereof, I have provided a novel stop for limiting the rotative movement of said lever arms to insure actuation of at least one or the other of the brakes connected thereto, despite breakage of one of said connections.

Further features of the invention and desirable details of construction and combinations of parts will become apparent from the detailed description of the invention to follow taken in connection with the figures of the drawing, in which:

Figure 1 is a diagrammatic plan view of an automobile chassis provided with four wheel brakes actuated by my novel operating mechanism;

Figure 2 is a section taken on line 2—2 of Figure 1 through the chassis disclosing in elevation my novel combination equalizing and safety mechanism;

Figure 3 is a section taken on line 3—3 of Figure 2 disclosing in detail the relation of the safety lever arms to the equalizer bar;

Figure 4 is a partial section taken on line 4—4 of Figure 2, disclosing the operating connection with the service pedal in enlarged detail;

Figures 5 and 6 are, respectively, sections taken on lines 5—5 and 6—6 of Figure 2, disclosing the arm and shaft connections of one of the cross shafts and the emergency operating shaft respectively;

Figure 7 is an enlarged transverse section taken on line 7—7 of Figure 2, disclosing the novel stop construction for limiting the swivelling movement of the double arm lever;

Figures 8 and 9 are, respectively, side and end elevations of a modified form of a double arm lever; and Figure 10 is a section similar to Figure 7, disclosing, in an enlargement, the stop structure of the modification of Figures 8 and 9.

I have disclosed in Figure 1 a conventional automotive chassis 10 spring supported on front and rear axles 12 and 14 respectively, the latter having mounted thereon the usual vehicle wheels preferably though not necessarily with internal expanding brakes 16.

My invention has to do particularly with the operating mechanism for the brakes and comprises in general a single cross shaft structure comprising a pair of co-axial cross shaft members 18 and 20 journalled in bearing brackets 22 and 24, secured respectively to the frame members 26 and 28. The outer ends of the cross shaft members 18 and 20 project beyond the side rail frame members 26 and are provided, at said projecting portions, with a novel double arm structure described in more detail hereafter, the latter being suitably connected at their ends to the brakes by the pull rods or tension elements 29, all as clearly disclosed in Figure 1.

According to the principal feature of my invention, I have provided a novel combined equalizer and safety mechanism, more clearly disclosed in its entirety in Figure 2. This latter structure comprises a tubular shaft 30 sleeved or telescoped at its ends over the adjacent ends of the spaced apart cross shaft members 18 and 20. Rigidly secured as by welding or through bolts to the tubular shaft 30, are depending arms 32, 33 and 34, arm 33 being reduced at its end and protruding through an opening in the center of an equalizer bar 36. Bar 36 may be provided at its ends with reduced end portions 38 which are received within eyes formed in the ends of the arms 40. The arms 40 are rigidly secured as by split boss constructions, to the ends of the cross shaft members 18 and 20 respectively.

According to an important feature of the invention and quite necessary to the operation thereof, the ends of the arms 32 and 34 are positioned a predetermined distance behind the equalizer bar 36, as clearly disclosed in Figure 3. The service pedal 42 of the car may be suitably connected in any desired manner, as by tension element 44, to the end of the arm 33 just above the equalizer bar, all as disclosed in detail in Figure 4. I prefer the connection between the tension or pull rod 44 and the arm 33 to be a ball and socket one, as disclosed, in order to insure freedom of movement of the parts and positive actuation of the arm 33.

In operation, actuation of the pedal 42 serves, through the tension rod 44, to pull the equalizer bar 36 forwardly thereby imparting angular movement to the arms 40 and their respective cross shafts 18 and 20, thus effecting equalized operation of the brakes by virtue of the inherent function of the bar 36. Equal forces are transmitted by the arms 40 to rotate the shafts 18 and 20, the bar swivelling about the end of the arm 33 to accomplish this balancing of moments.

If, for any unforeseen reason, one of the cross shafts 18 or 20 become broken or possibly both of the pull rods on one side or the other of the chassis become inoperative, there will be no reaction to the swivelling of the equalizer bar and therefore no movement will be imparted to the operative side of the brake mechanism. It will be seen, however, that the limit of the swivelling movement of the bar 36 is limited to the distance between its normal position and the position of the arms 32 and 34. Therefore, should the above condition exist, the bar will swivel until contact is had with one or the other of the arms 32 or 34, whereupon further movement of the bar by the service pedal will serve to effect the necessary angular movement of one or the other of the operating arms 40 to thus actuate at least one set of brakes.

In order that there be two independent means for operating the four brakes of the vehicle, I have provided a novel supplemental structure preferably comprising a tubular shaft 46 sleeved over shaft 20, as disclosed in Figure 2, the shaft 46 extending through the bearing 22 and rigidly clamped at its end to an arm 48, as more clearly disclosed in detail in Figure 6. The inner end of the shaft 46 has its bearing in the bracket 24 and at said end, there is rigidly secured thereto, preferably by welding, an angular shaped rod 50 normally lying behind and adapted to contact arm 34. In operation, actuation of the arm 48 by suitable connections with say the emergency or hand lever 52, serves to impart rotative movement to the shaft 46 which thus moves the rod 50 into contact with the arm 34, imparting rotative movement thereto. Arm 34 which is rigidly secured to the shaft 30 therefore serves to actuate the arm 33, the entire structure just described thus providing a supplemental control means for the four brakes.

According to another important feature of my invention, I have provided a novel means for equalizing the forces distributed to the front and rear brakes of each pair of right and left brakes. In the accomplishment of the above, I have provided the ends of the shafts 18 and 20 with enlarged hub portions 58, provided with a cross bore adapted to receive the smaller diametered section of a double arm lever member 60. Member 60 is preferably threaded at its lower end to receive lock nuts 62 and is also provided at said end with a right angular extending arm 64, secured thereto as by nut 68. The upper and larger portion of the double arm member 60 is also provided with a right angular extending arm member 70. Arms 64 and 70 are provided at their ends with eyes to be suitably secured to the pull rod tension members 29. The upper arm of the member 60 is also provided with a projection 72 fitting within a V shaped slot in the upper edge of the hub 58.

By virtue of the above described structure, rotative movement of the cross shaft sections imparts an angular movement to the arms 60 which in turn, through the end arms 64 and 70, impart the necessary brake actuating movement to the pull rods 29. By virtue of the swivelling movement of the member 60 within the hub 58, the forces transmitted to the front and rear brakes of each right and left set of brakes are equal. Should breakage of one of the rods 29 occur, the stop 72 will limit the swivelling of the member 60 and thus usual actuation of at least one of the brakes of the pair is still accomplished.

In Figures 8, 9 and 10, I have provided a modified form of lever construction comprising a hub 73 forming in effect a split boss receiving clamping bolt 74. A filler piece 76 serves to strengthen the bearing and the lever shank is also provided with a stop 78 similar in construction and function to the stop 72.

There is thus provided a very compact and rigid brake operating mechanism insuring equal distribution of forces to each of the four brakes of the vehicle and at the same time, increasing the factor of safety of the mechanism by virtue of my novel safety device co-operating with the equalizing mechanism. Failure of one set of front and rear brakes does not preclude operation of the remaining set of brakes nor does breakage of one or the other of the pull rods 29 of each set preclude the operation of the remaining rod of the set.

This application is junior to the copending application of Phillip O. Troutman No. 401,770 which is owned by the same assignee. Generic claims covering structures common to both applications will be placed in the said Troutman application.

While preferred embodiments of the invention have been described, it is to be understood that these are given merely as examples of the underlying principles of the invention and since these may be incorporated in other specific mechanical structures, I do not intend to be limited to those shown, except as such limitations are clearly imposed by the appended claims.

I claim:
1. A brake mechanism comprising, in combination with the brakes on the four wheels of a vehicle, a cross shaft structure having connections with said brakes, said structure being in two parts, each of said parts being connected to an equalizer bar together with a rotatable safety mechanism co-operating with both the aforementioned shaft parts and with the equalizer bar to insure operation of at least one of said parts.

2. Operating mechanism for four wheel brakes comprising a two part cross shaft, said parts being co-axial and spaced apart to receive a tubular shaft sleeved thereon, said latter shaft constituting part of a safety mechanism for insuring actuation of at least one of the shaft parts.

3. Operating mechanism for four wheel brakes comprising a two part cross shaft, said parts being co-axial and spaced apart to receive a tubular shaft sleeved thereon, said latter shaft constituting part of a safety mechanism for insuring actuation of at least one of the shaft parts, together with an equalizing means connected to said shaft parts, said means serving as the power transmitting connection between the safety mechanism and the shaft parts.

4. Operating mechanism for four wheel brakes comprising a two part cross shaft, said parts being co-axial and spaced apart to receive a safety mechanism comprising a hollow shaft telescoped at its ends over the ends of the cross shaft parts, said hollow shaft having spaced apart operating arms rigidly secured thereto.

5. A brake operating mechanism mounted on the chassis of a vehicle comprising a plurality of co-linear shafts, one of which serves as a part of safety mechanism to insure operation of at least one of the remaining shafts when co-operating with a manually operable equalizing mechanism secured to a plurality of said shafts.

6. A brake operating mechanism mounted on the chassis of a vehicle comprising a plurality of co-linear shafts, one of which serves as a part of safety mechanism to insure operation of at least one of the remaining shafts when co-operating with a manually operable equalizing mechanism secured to a plurality of said shafts, together with a second manually operable mechanism having a part telescoping one of said shafts, said latter mechanism also having a part co-operating with said aforementioned safety mechanism to actuate the same.

7. A brake operating mechanism comprising a rotatable cross shaft part having two angle shaped arms extending from one end thereof, each mounted to swivel therein providing for angular movement of the ends of said arms about the axis of the arms, together with means on one of said arms for limiting the swivelling movement of both of said arms.

8. An equalized braking system including an actuating shaft, means for oscillating said shaft, a housing secured to said shaft, a second shaft having a bearing within said housing permitting oscillatory movement thereof about an axis angularly related to the axis of oscillation of the first shaft, an arm adjustably connected to said second shaft and extending laterally therefrom, and a connection from said arm to a brake.

9. An equalized braking system including an actuating shaft, means for oscillating said shaft, a housing secured to said shaft, a second shaft having a bearing within said housing permitting oscillatory movement thereof about an axis angularly related to the axis of oscillation of the first shaft, an arm removably secured to said second shaft and extended laterally therefrom, and a connection from said arm to a brake.

JOHN SNODGRASS.